(12) United States Patent
Gretz

(10) Patent No.: US 8,466,378 B1
(45) Date of Patent: Jun. 18, 2013

(54) SNAP-IN ELECTRICAL CABLE CONNECTOR WITH RAISED GROUNDING LUG

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 243 days.

(21) Appl. No.: 13/135,411

(22) Filed: Jul. 5, 2011

(51) Int. Cl.
*H02G 3/18* (2006.01)

(52) U.S. Cl.
USPC ........... 174/659; 174/662; 174/663; 174/665; 174/552; 439/95; 439/98; 439/100; 439/101; 439/939

(58) Field of Classification Search
USPC .... 174/650, 659, 662, 663, 552, 557; 248/56, 248/62, 71, 74.1, 74.2, 74.3; 430/194, 199, 430/238, 239, 243, 252, 254, 362; 439/95, 439/97, 98, 100, 101, 939
See application file for complete search history.

(56) References Cited

U.S. PATENT DOCUMENTS

| | | | |
|---|---|---|---|
| 5,373,106 A | 12/1994 | O'Neil | |
| 6,444,907 B1 * | 9/2002 | Kiely | 174/657 |
| 6,916,988 B1 * | 7/2005 | Auray et al. | 174/665 |
| 7,390,979 B1 | 6/2008 | Johnson | |
| 7,432,452 B2 | 10/2008 | Gardner | |
| 7,824,213 B1 | 11/2010 | Korcz et al. | |

* cited by examiner

*Primary Examiner* — Hoa C Nguyen
*Assistant Examiner* — Ahmad D Barnes

(57) ABSTRACT

A snap tight electrical connector for securing and grounding an electrical cable or conduit to a junction box. The electrical connector includes a one-piece, electrically conductive connector body with a seat on the leading end and an electrically conductive snap ring held in the seat. A raised grounding lug on the seat of the connector body extends through a notch in the snap ring and provides a direct path for establishing an electrical grounding path between the connector body and the junction box. Locking tangs on the snap ring provide a secure snap-fit engagement between the connector body and the junction box. The raised grounding lug on the seat of the connector body provides a direct grounding path between the connector body and the junction box, thereby improving electrical continuity and lowering the millivolt drop between the connector body, the junction box, and the electrical cable or conduit secured to the connector body.

19 Claims, 8 Drawing Sheets

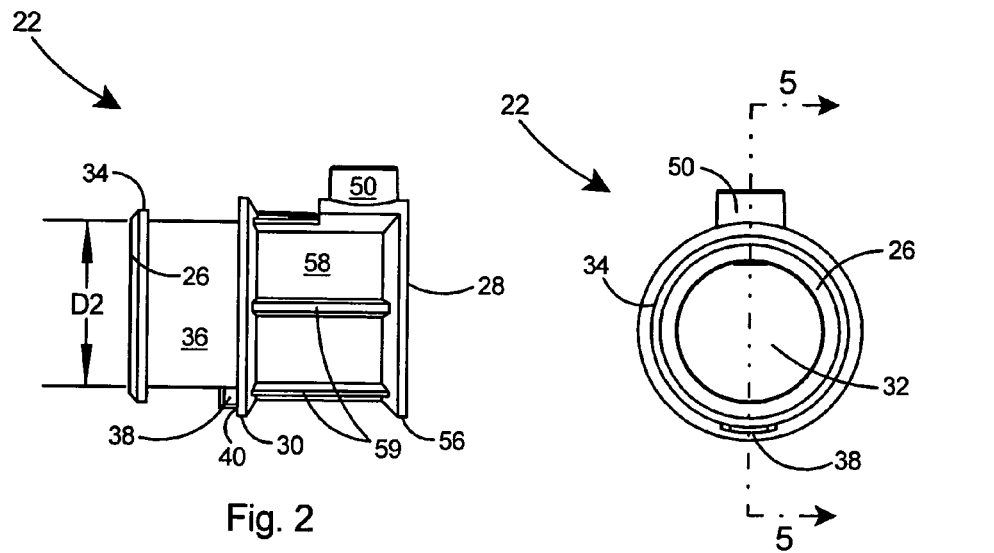
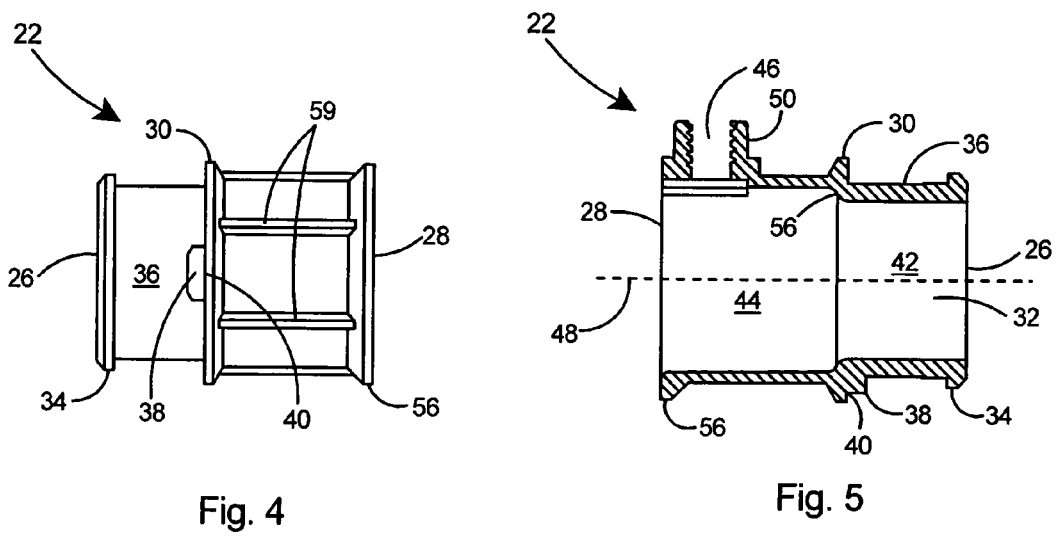

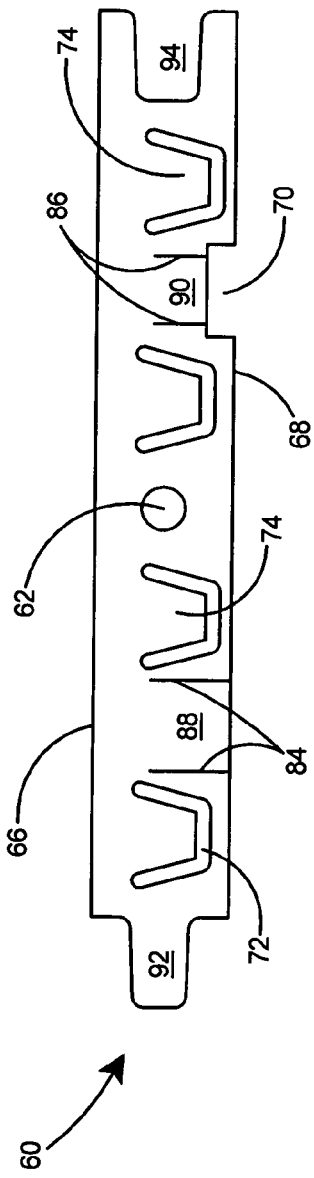
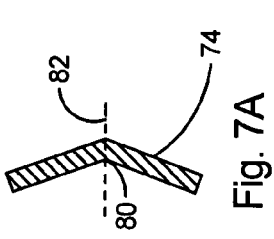
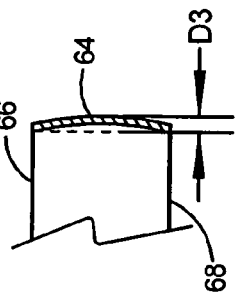
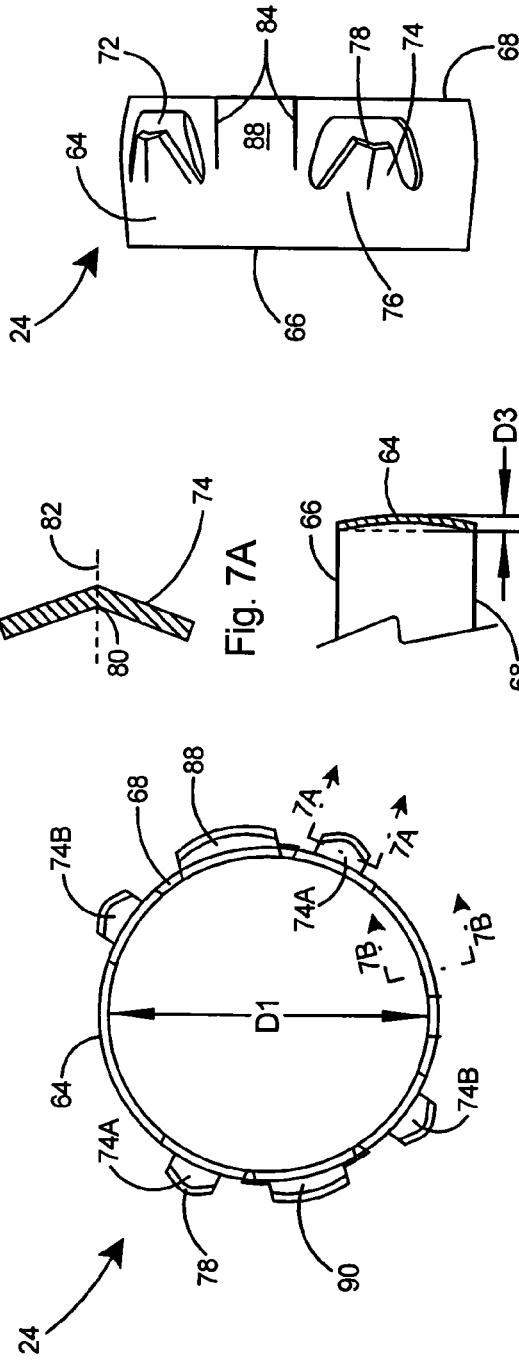
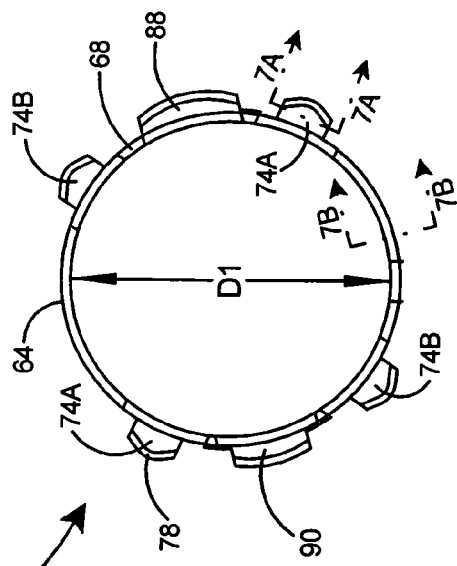

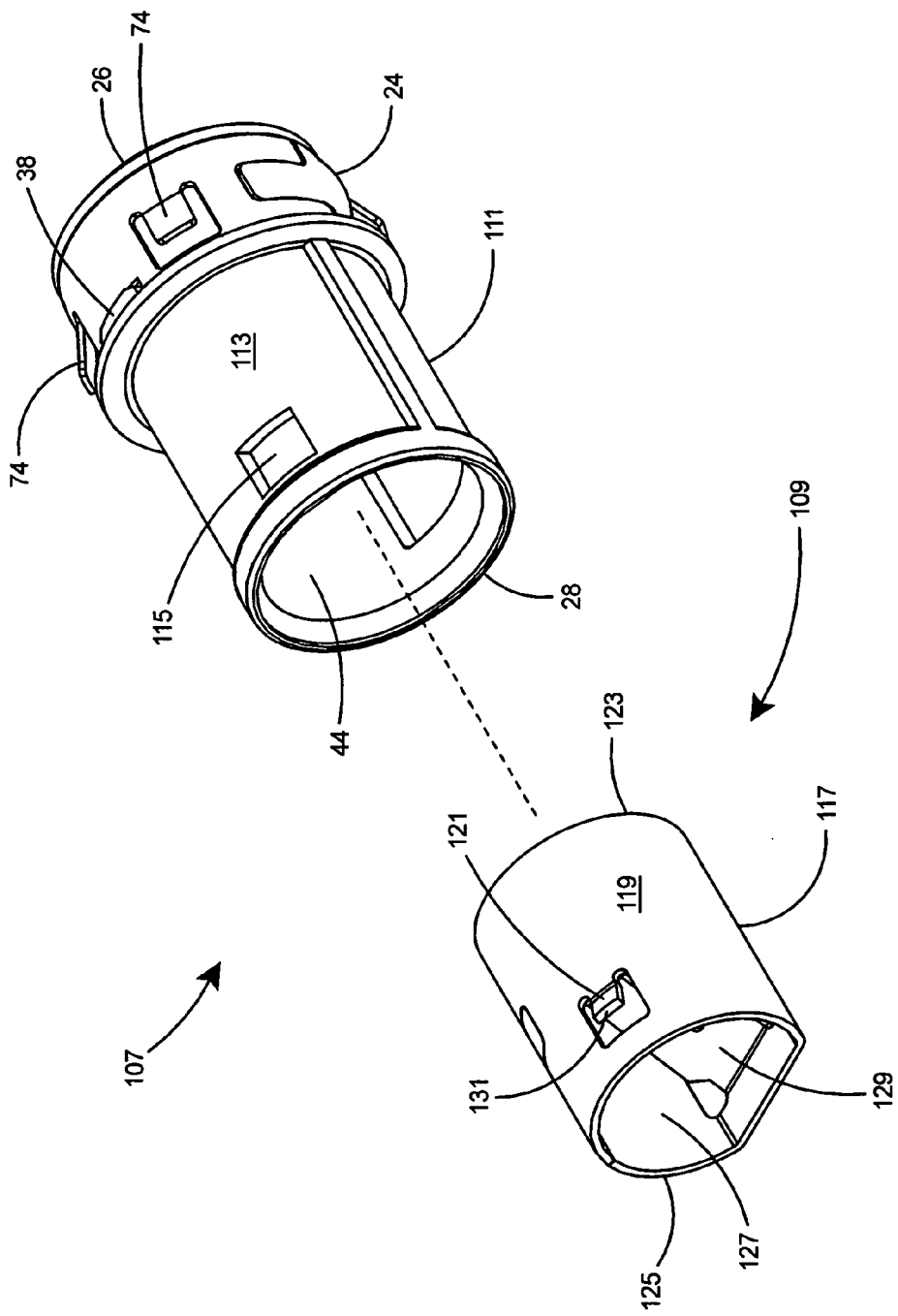

SNAP-IN ELECTRICAL CABLE CONNECTOR WITH RAISED GROUNDING LUG

FIELD OF THE INVENTION

This invention relates to fittings for connecting electrical cables or metal conduit to a panel and specifically to a snap tight electrical connector that provides improved electrical continuity and a low millivolt drop between the electrical connector, the electrical cable, and the junction box or electrical panel.

BACKGROUND OF THE INVENTION

In the electrical wiring of buildings, it is common to use electrical cables that include an outer sheath that provides the grounding for the cable. Such electrical cables include flexible metal conduit, electrical metal tubing (EMT), armored cable, and metal clad (MC) cable. When using metal sheathed cables, the electrical code stipulates that the outer sheaths of the cables must establish a proper electrical ground, or electrical continuity, with all junction boxes and electrical panels to which they are connected. In order to simplify and speed up the task of installing such wiring, the owner of the present invention introduced snap fit electrical connectors or snap fittings. The snap fittings significantly speeded up the process of installing such wiring and also provided for the proper grounding of the electrical cabling to the junction boxes and panels to which it was connected.

Maintaining a proper ground, or electrical continuity, between the connector, the electrical cable or conduit, and the junction box is a primary consideration in the design of such electrical connectors. The current application shares common ownership with U.S. Pat. Nos. 5,373,106, 6,709,280, and 6,780,029, which described snap fit electrical fittings or connectors all of which included a connector body and a snap ring for locking the electrical fitting to the junction box. All of these patents disclosed various modifications and to the snap ring that were directed to improving the electrical continuity or ground between the electrical connector, the junction box, and the electrical cable.

Although the snap fittings of the aforementioned patents provided a suitable snap-in or quick connect fitting with adequate electrical continuity, the present invention provides a snap fit electrical connector with improved electrical continuity between the fitting, the cable or conduit, and the junction box. The improved design includes a modified connector body and a modified snap ring. Modifications to the connector body include a raised grounding lug integral with a seat on the leading end of the connector body. Modifications to the snap ring include a notch for accommodating the raised grounding lug of the connector body and thereby establishing a direct electrical grounding path between the connector body and the junction box. The snap tight electrical connector of the present invention provides improved electrical continuity and a lower millivolt drop across the connector, the electrical cable or conduit, and the junction box.

These and other advantages will become apparent by reading the attached specification and claims in conjunction with reference to the attached drawings.

SUMMARY OF THE INVENTION

The present invention is a snap tight electrical connector for quickly connecting an electrical cable or conduit to a junction box or similar electrical box or panel. The electrical connector provides improved electrical continuity between the electrical connector, the cable or conduit, and the junction box. The snap tight electrical connector includes a one-piece electrically conductive connector body with a seat on the leading end and an electrically conductive snap ring disposed in the seat. A raised grounding lug is provided on the seat of the connector body and a notch is provided in the snap ring. The grounding lug extends through the notch in the snap ring and provides a direct path for establishing a ground between the connector body and the junction box that it is connected to, thereby lessening dependence on the tangs of the snap ring to establish a grounding path between the connector body and the junction box. Locking tangs are provided on the snap ring to provide a secure snap-fit engagement between the connector body and the junction box when the electrical connector is pressed within a knockout aperture in a junction box. The raised grounding lug on the seat of the connector body provides a direct grounding path between the connector body and the junction box, thereby improving electrical continuity and lowering the millivolt drop between the connector body, the electrical cable, and the junction box.

OBJECTS AND ADVANTAGES

Several advantages are achieved with the snap tight electrical connector of the present invention, including: (1) The electrical continuity between the connector body, electrical cable, and junction box are improved over prior art snap-in connectors. (2) The connector body includes a raised grounding lug that creates direct contact between the connector body and the junction box and thereby creates a direct grounding path between the connector body and the junction box. (3) The snap-in electrical connector provides improved grounding and a lower millivolt drop than prior art snap-in connectors. (4) The connector body is die-cast in one piece, thereby ensuring good electrical continuity throughout the connector body.

These and other objects and advantages of the present invention will be better understood by reading the following description along with reference to the drawings.

DESCRIPTION OF THE DRAWINGS

FIG. 2 is a side view of the connector body that forms a portion of the snap-in electrical connector of FIG. 1.

FIG. 3 is an end view of the connector body from the leading end of the connector body or as viewed from the left side of FIG. 2.

FIG. 4 is a top view of the connector body.

FIG. 5 is a sectional view of the connector body taken along line 5-5 of FIG. 3.

FIG. 6 is a plan view of a blank that is used to form the snap ring that forms a portion of the snap-in electrical connector of FIG. 1.

FIG. 7 is an end view of the snap ring that forms a portion of the snap-in electrical connector of FIG. 1.

FIG. 7A is a sectional view of a locking tang taken along line 7A-7A of FIG. 7.

FIG. 7B is a sectional view of a locking tang taken along line 7B-7B of FIG. 7.

FIG. 8 is a side view of the snap ring.

FIG. 18 is a perspective view of an alternative embodiment of a snap-in electrical connector according to the present invention including an alternative cable attachment arrangement on the trailing end of the connector body.

Figure 1:
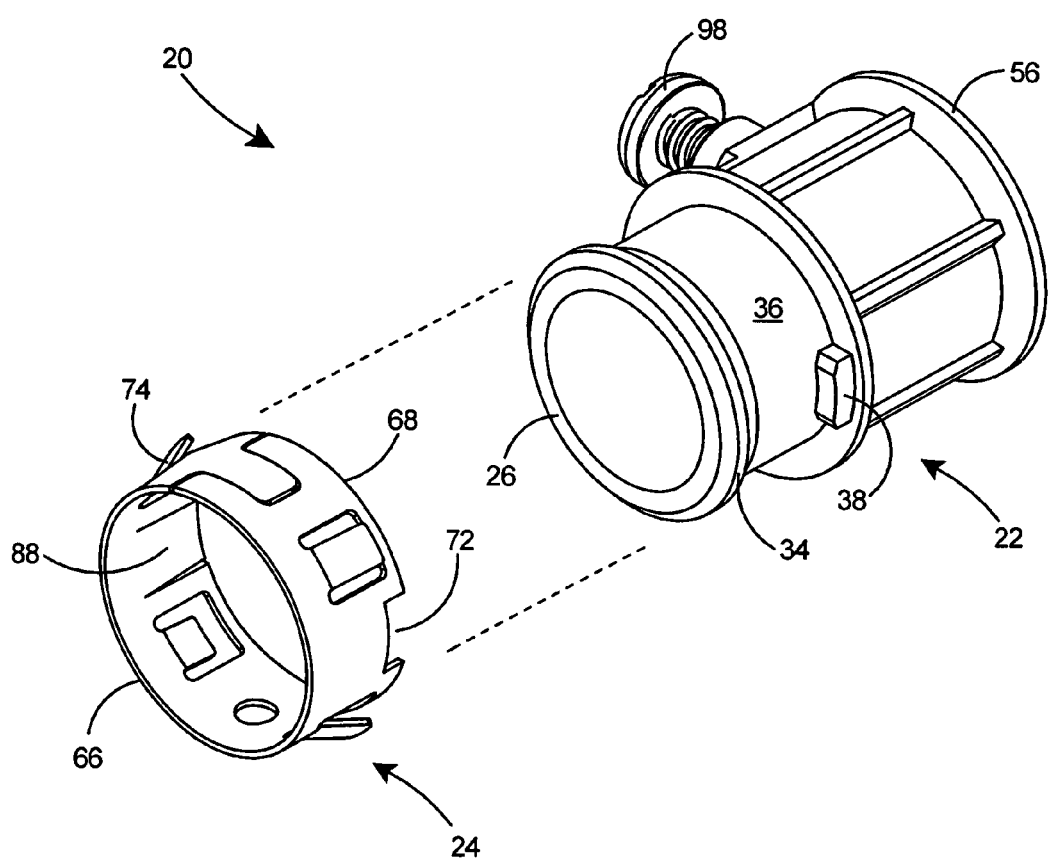
FIG. 1 is an exploded perspective view of a first and preferred embodiment of a snap-in electrical connector according to the present invention.

INDEX TO REFERENCE NUMERALS IN DRAWINGS 20 snap-in electrical connector, preferred embodiment
22 connector body
24 snap ring
26 leading end of connector body
28 trailing end of connector body
30 main flange
32 bore
34 leading flange
36 cylindrical seat
38 raised lug
40 side of lug integral with main flange
42 leading bore
44 trailing bore
46 threaded bore
48 central axis of the trailing bore
50 boss
54 peripheral lip
56 trailing flange
58 outer surface
59 longitudinal rib
60 blank
62 central aperture
64 ring body
66 leading end of ring body
68 trailing end of ring body
70 U-shaped slot
72 notch
74 locking tang
74A first pair of locking tangs
74B second pair of locking tangs
76 leading end of locking tang
78 trailing end of locking tang
80 V-shaped notch
82 central bend line
84 first pair of slits
86 second pair of slits
88 tensioning tang
90 guard tang
92 tongue
94 groove
96 cable attachment arrangement
98 threaded fastener
101 electrical cable
103 knockout hole
105 wall of junction box
107 snap-in electrical connector, second embodiment
109 cable attachment arrangement
111 connector body
113 wall of connector body
115 opening
117 cable retainer
119 tubular body of cable retainer
121 wall engagement tang
123 leading end of cable retainer
125 trailing end of cable retainer
127 bore
129 cable retaining tang
131 free end of wall engagement tang
D1 inside diameter of snap ring
D2 outside diameter of cylindrical seat
D3 distance center of ring body is bowed outward

DETAILED DESCRIPTION OF THE INVENTION

With reference to FIG. 1 there is shown an exploded view of the preferred embodiment of a snap-in electrical connector 20 according the present invention. The snap-in electrical connector 20 includes a connector body 22 and a snap ring 24.

Referring to FIGS. 2-5, the tubular connector body 22 is of one-piece die-cast construction and includes a leading end 26, a trailing end 28, a main flange 30, and a bore 32 there through. A leading flange 34 is included on the leading end 26 of the connector body 22. A smooth, cylindrical seat 36 is provided between the leading flange 34 and main flange 30 of the connector body 22. The seat 36 is of a smaller diameter than the diameters of the leading flange 34 and the main flange 30.

The connector body 22 includes a raised grounding lug 38 extending from the surface of the cylindrical seat 36. The raised grounding lug 38 is an integral portion of the one-piece connector body 22 and is integral on one side 40 with the main flange 30 of the connector body 22. The bore 32 of the connector body 22 includes a leading bore 42 at the leading end 26 and a trailing bore 44 at the trailing end 28, with the trailing bore 44 of a larger diameter than the leading bore 42. The connector body 22 further includes at the trailing end 28 a threaded bore 46 that is axially aligned substantially perpendicular to the central axis 48 of the trailing bore 44. A boss 50 extends outward of the trailing end 28 of the connector body 22. The threaded bore 46 of the connector body 22 extends through boss 50. A peripheral lip 54 is provided as a result of the change in diameter at the juncture of the trailing bore 44 with the leading bore 42. The peripheral lip 54 will function as a cable stop to limit the forward travel of an electrical cable (not shown) that is inserted into the trailing bore 44 of the connector body 22 during operation of the snap-in electrical connector of the present invention. The connector body 22 further includes a trailing flange 56 at the trailing end 28, an outer surface 58, and a plurality of longitudinal ribs 59 extending along the outer surface 58 between the main flange 30 and the trailing flange 56.

With reference to FIGS. 6-8, the snap ring 24 is formed from a blank 60 of spring steel which is then formed and annealed into the resilient circular or ring-shaped snap ring 24 depicted in FIGS. 7 and 8. FIG. 6 depicts the blank 60 and includes the layout of the various elements of the snap ring 24.

The blank 60 includes a central aperture 62 therein for the purpose of locking the blank 60 into a mandrel during the forming and annealing step to form the blank into the cylindrical snap ring. The snap ring 24 includes tubular ring body 64 having a leading end 66, a trailing end 68, and a notch 70 in the trailing end 68. The interior of the snap ring, between the leading end 66 and the trailing end 68, includes a plurality of U-shaped slots 72 formed therein with the slots 72 defining locking tangs 74. The locking tangs 74 include a leading end 76 and a free trailing end 78 with the leading end 76 cantilevered from the ring body 64 and the free trailing end 78 bent outward of the ring body 64. The free trailing end 78 of each locking tang 74 includes a V-shaped notch 80 thereon and a central bend line 82 around which the locking tang 74 is bent as shown in FIG. 7A. Preferably, the snap ring 24 includes four locking tangs 74 arranged at approximately equal intervals around the ring body 64.

The snap ring 24 further includes two pairs of slits 84 and 86 in the ring body 64. A first pair of slits 84 extend from the trailing end 68 to form a portion of the ring body 64 that is bent outward of the ring body 64 to define a tensioning tang 88. A second pair of slits 86 extend from the notch 70 to form a portion of the ring body 64 that is also bent outward of the ring body 64 to form a guard tang 90. As shown in FIG. 7, the guard tang 90 is preferably located on the opposing side of the ring body 64 or approximately 180° across the ring body 64 from the tensioning tang 88. The snap ring 24 preferably includes two pairs of locking tangs 74A and 74B with each locking tang in a pair of locking tangs positioned 180° apart from one another on the ring body 64.

The blank 60 of the snap ring 24 is formed into a ring as shown in FIG. 7 and, as shown by the cross-section across the ring body 64 in FIG. 7B, is bowed outwards. Thus the center of the ring body 64 is bowed outwards so that it extends to a farther distance, as denoted by distance D3 in FIG. 7B, than do the two ends 66 and 68 of the ring body. Bowing the ring body 64 outward gives more spring to the snap ring 24 than prior art snap rings which are typically flat across the width of the ring body. The snap ring 24 is a split ring as there is a slight gap between the two ends of the ring. One end of the split snap ring includes a tongue 92 on one end of the ring and a groove 94 on the opposite end of the ring. When formed into a ring the tongue 92 of one end of the ring body 64 will extend partially within the groove 94 on the opposing end of the ring body. The snap ring 24 is formed and annealed into a ring that includes an inside diameter D1 that is slightly smaller than the outside diameter D2 (see FIG. 2) of a cylindrical seat 36 that it will be used in conjunction with.

Figure 9:
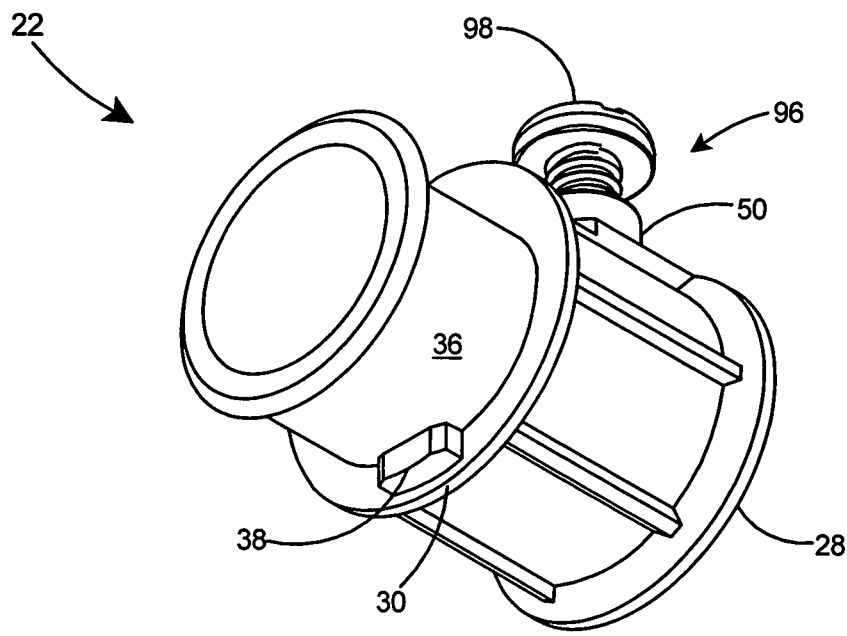
FIG. 9 is a perspective view of the connector body as viewed from the leading end.
Figure 10:
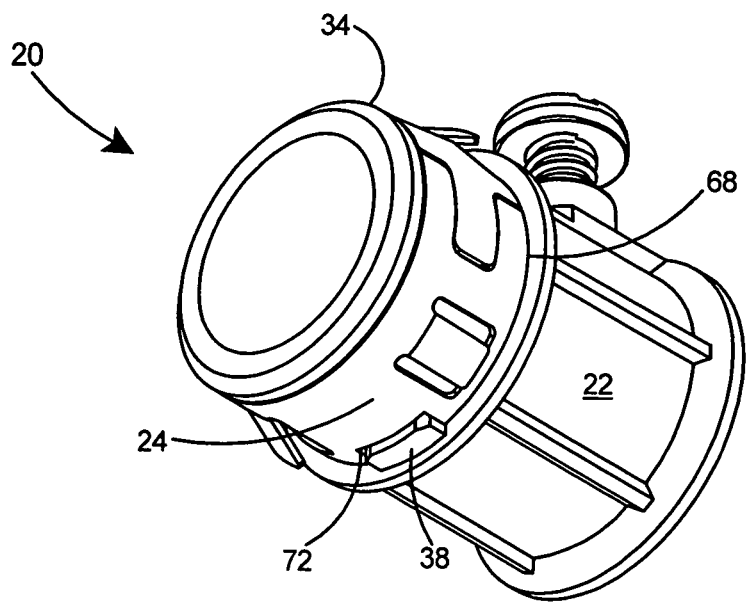
FIG. 10 is a perspective view of the snap-in electrical connector as viewed from the leading end.

Referring to FIGS. 9 and 10, the raised grounding lug 38 extends from the cylindrical seat 36 and is integral with the connector body 22 and main flange 30. The connector body 22 may be machined or die-cast from any electrically conductive metal including steel, copper, silver, or zinc. Most preferably, the connector body 22 is die-cast from a zinc alloy. The snap-in connector includes a cable attachment arrangement 96 for securing an electrical cable (not shown) within the trailing end 28 of the connector body 22. The cable attachment arrangement 96 for securing an electrical cable includes the threaded bore (see FIG. 5) 46 in the boss 50 of the connector body 22 and a threaded fastener 98. As shown in FIG. 10, the snap ring 24 is secured to the leading end 26 of the connector body 22. As the snap ring 24 is a split ring formed to a smaller diameter than the diameter of the cylindrical seat 36, the snap-in electrical connector 20 is assembled by orienting the trailing end 68 of the snap ring 24 toward the connector body 22, aligning the notch 72 of the snap ring 24 with the raised grounding lug 38 of the connector body 22, and slipping the snap ring 24 over the leading flange 34 onto the seat 36. The tendency of the resilient snap ring 24 to return to its unbiased diameter will hold snap ring 24 securely onto the seat 36 of the connector body 22. As shown in FIG. 10, in the assembled snap-in electrical connector 20, the raised integral lug 38 of the connector body 22 advantageously extends completely through the snap ring 24 at the notch 72, thereby creating a direct grounding path from the connector 20 to any junction box or panel that is later secured to.

Figure 12:
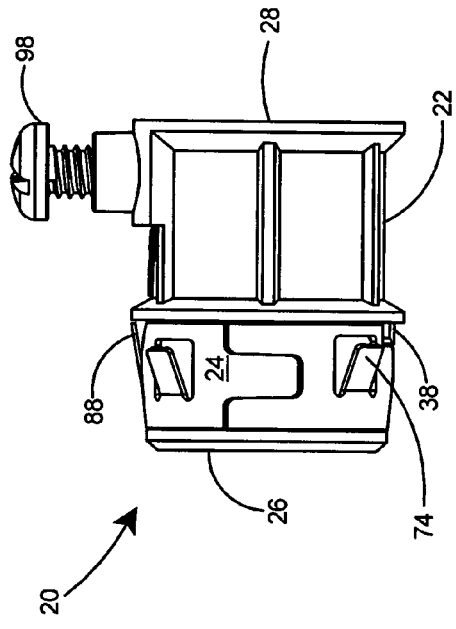
FIG. 12 is a side view of the snap-in electrical connector as viewed from the right side of FIG. 11.
Figure 11:
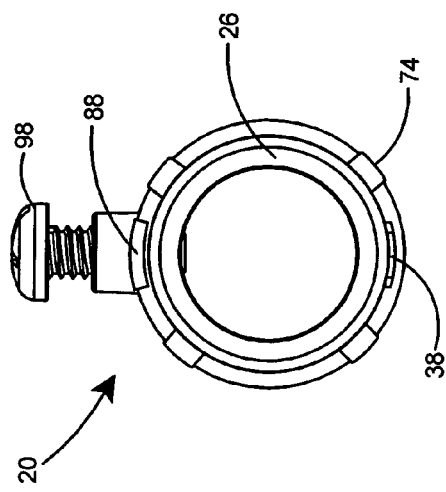
FIG. 11 is a front view of the snap-in electrical connector of the present invention.
Figure 13:
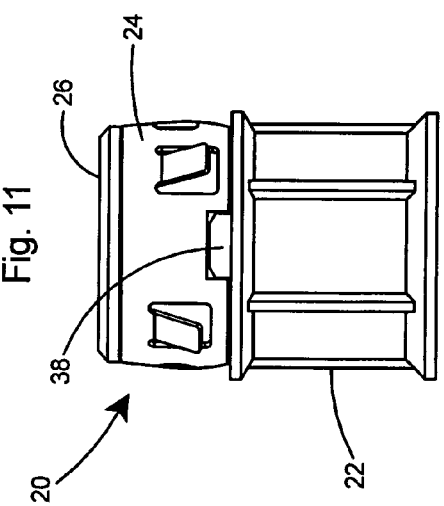
FIG. 13 is a side view of the snap-in electrical connector as viewed from the bottom of FIG. 11.

With reference to FIGS. 11-13, in the assembled snap-in electrical connector 20, the tensioning tang 88 is oriented on the opposite side or approximately 180° across the leading end 26 of the connector body from the raised grounding lug 38. Thus, as the leading end 26 of the connector body 22 is pressed within a knockout hole of an electrical box (not shown), the tensioning tang 88 will force the raised grounding lug 38 into engagement with the electrical box wall surrounding the knockout hole.

Figure 14:
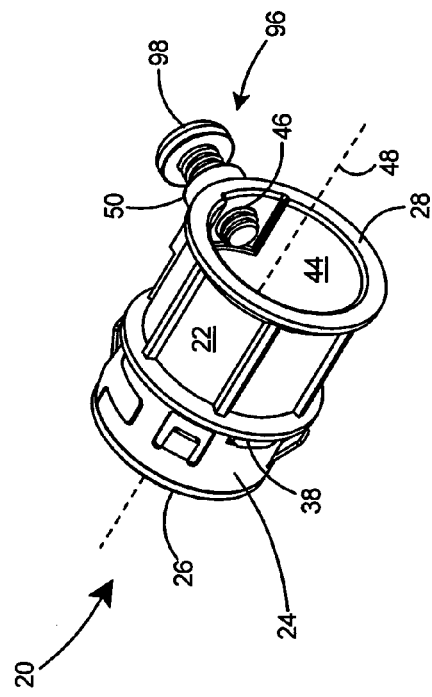
FIG. 14 is a perspective view of the snap-in electrical connector as viewed from the trailing end of the connector body.

As shown in FIG. 14, the cable attachment arrangement for securing an electrical cable 96 to the trailing end 28 of the connector body 22 includes threaded fastener 98 which is at an angle of approximately 90° from the central axis 48 of the trailing bore 44. Threaded fastener 98 is held within threaded bore 46 in boss 50. To secure an electrical cable (not shown) to the trailing end 28 of the connector body 22 an installer simply inserts the cable within the trailing bore 44 until the cable seats against the peripheral lip 54 (see FIG. 5), after which the threaded fastener 98 is tightened against the electrical cable to hold it firmly within the trailing bore 44 and ground the outer conductive sheath to the connector body 22 and thus to the snap-in electrical connector 20.

Figure 15:
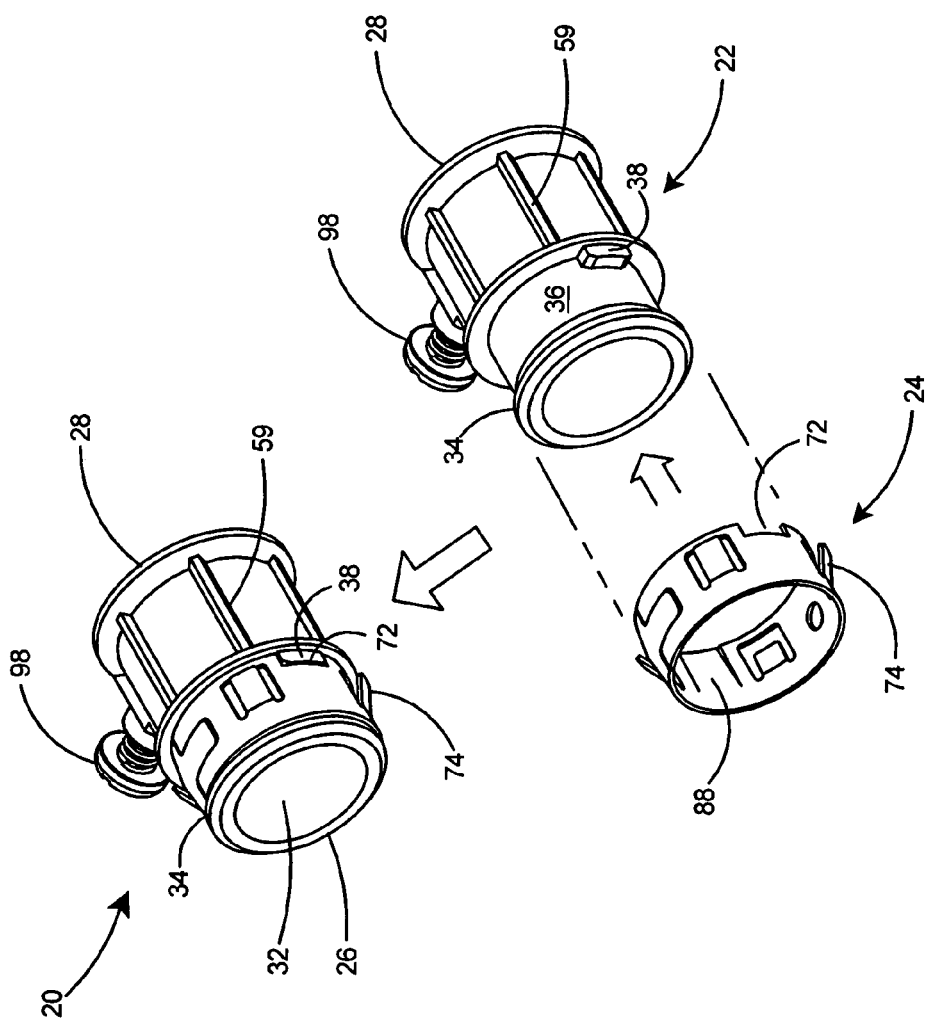
FIG. 15 is a conceptual view depicting the snap-in electrical connector in an unassembled condition with the snap ring exploded away from the connector body and in an assembled condition.
Figure 16:
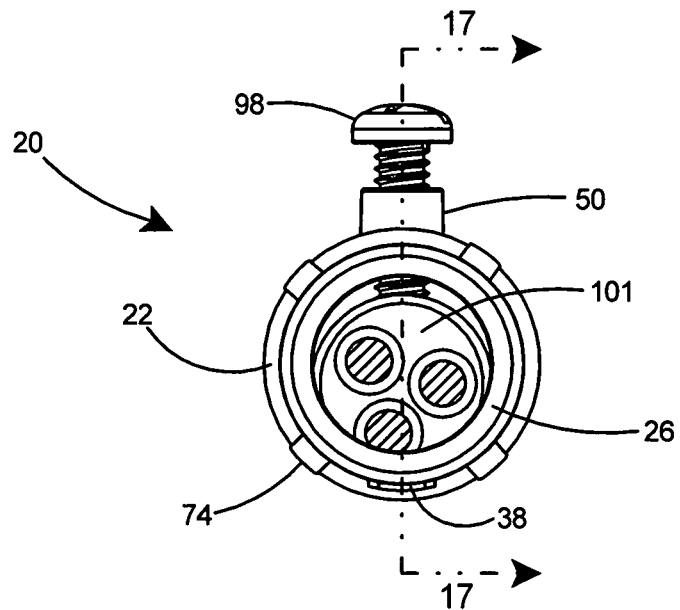
FIG. 16 is an end view of the snap-in electrical connector from the leading end of the connector body.

Referring to FIG. 15, the lower portion of the figure depicts the alignment of the notch 72 on snap ring 24 with the raised grounding lug 38 of the connector body 22, after which the snap ring 24 is slipped over the leading flange 34 until it clears the leading flange and seats on the cylindrical seat 36 of the connector body 22. As shown in the assembled snap-in electrical connector 20 in the top portion of the figure, the raised boss extends through the snap ring 24. The one-piece connector body 22 is preferably constructed of metal and more preferably is die-cast of a die-casting metal alloy. The die-cast metal alloy is preferably a zinc alloy and most preferably is ZAMAK™, a casting alloy comprised mainly of zinc alloyed with aluminum, magnesium, and copper and available from Eastern Alloys, Maybrook, N.Y. By constructing the tubular body of ZAMAK™ or other appropriate metals, the connector body 22 will be electrically conductive and provide good continuity throughout the fitting.

The snap ring 24 is preferably constructed of spring steel to impart toughness and flexibility to the various tangs located thereon. Most preferably, the snap ring 24 is constructed of 1050 spring steel and includes a thickness of the spring steel material of 0.015 to 0.030 inch. The snap-in electrical connector 20 of the present invention is used to secure electrical cables with an outer conductive sheath, such as metal clad (MC), metal clad all purpose (MCAP), flex cable, or continuous corrugated MC cables to a metallic junction box or panel. The snap-in electrical connector insures that the outer conductive sheath of such cables will be electrically grounded through the connector body to the junction box.

Figure 17:
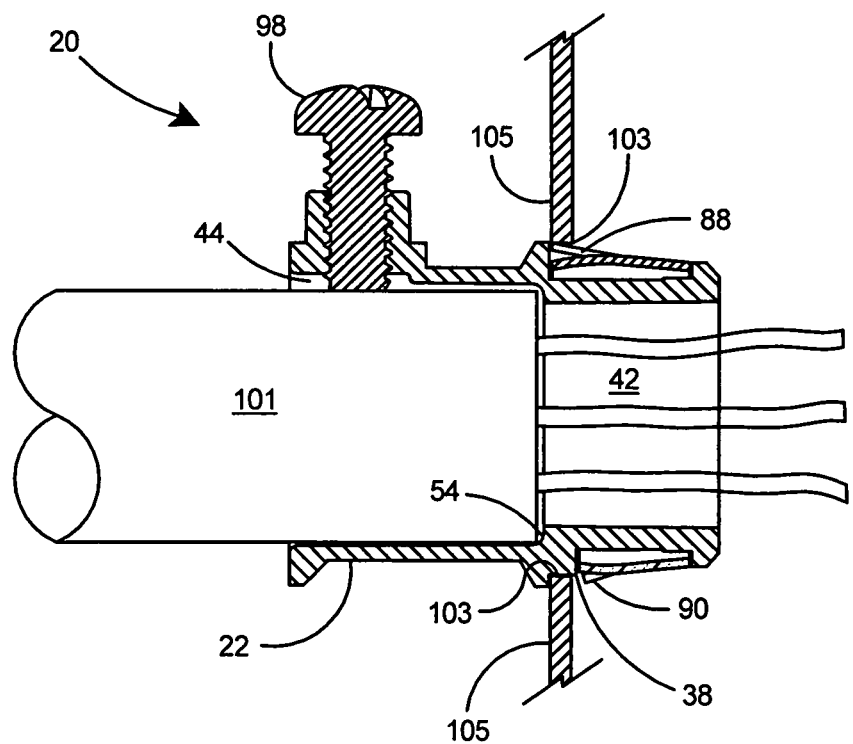
FIG. 17 is a sectional view of the snap-in electrical connector taken along line 17-17 of FIG. 16 with the leading end of the connector body secured to the wall of an electrical junction box and with an armored cable secured to the trailing end of the connector body.

With reference to FIG. 17 there is shown a sectional view of the snap-in electrical connector 20 depicting a three-conductor MC cable 101 secured to a knockout hole 103 in the wall 105 of a junction box. The MC cable 101 is in contact with the peripheral lip 54 of the connector body 22 and is held securely in the trailing bore 44 by threaded fastener 98. Raised grounding lug 38 is pressed into direct contact with the steel wall 105 of the junction box at the knockout. The tight fit is aided by tensioning tang 88 positioned approximately 180° across the snap ring from the raised grounding lug 38. Thus the electrical cable 101, the electrical connector 20 and the junction box, of which a wall portion 105 is shown, are all in direct metal-to-metal contact and a secure grounding path is made between the electrically conductive zinc connector body 22 and the junction box wall 105. Thus the raised grounding lug 38 is an integral portion of the all metal die-cast connector body 22 and the raised grounding lug 38 is in intimate and direct contact with the junction box. This leads to unexpected results in that the electrical continuity between the connector and the box is substantially improved over prior art snap ring connectors.

With reference to FIG. 18 there is shown an alternative embodiment of the snap-in electrical connector 107. Snap-in electrical connector 107 includes an alternative cable attachment arrangement 109 on the trailing end 28 of the connector body 111. Connector body 111 includes a wall 113 surrounding the trailing bore 44 and an opening 115 in the wall 113. A tubular cable retainer 117 is shown in axial alignment with the trailing bore 44. The cable retainer 117 includes a tubular body 119 and one or more outwardly bent wall engagement tangs 121 for engaging complementary openings 115 in the trailing end of the connector body 111. Tubular cable retainer 117 is preferably a split ring including a leading end 123, a trailing end 125, an axial bore 127 there through, and a cable retaining tang 129 extending inwardly from the tubular body 119 into the bore 127. The cable retaining tang 129 at one end is cantilevered from the tubular body 119 and its free end is directed toward the leading end 123 of the tubular body 119. The wall engagement tang 121 at one end is cantilevered from the tubular body 119 and its free end 131 is directed toward the trailing end 125. Cable retainer 117 is constructed of electrically conductive resilient metal. Snap-in electrical connector 107 is formed by sliding the cable retainer 117 into the trailing bore 44 of connector body 111 until wall engagement tang 121 snaps into opening 115 in connector wall 113. A tubular cable retainer is described in commonly owned U.S. Pat. No. 7,854,627, the entire contents of which are incorporated herein by reference. Tubular cable retainer 117 is preferably constructed from spring steel to provide resilience to the wall engagement tang 121 and cable retaining tang 129 that each extend from the tubular body 119.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A snap-in electrical connector for securing an electrical conduit or cable of the type having an electrically conductive outer sheath to a knockout aperture in the wall of an electrically conductive junction box comprising:
    a tubular connector body including a leading end, a trailing end, a main flange, a leading bore, and a trailing bore;
    a leading flange on said leading end of said connector body;
    a seat extending between said main flange and said leading flange, said seat of a smaller diameter than the diameters of said leading flange and said main flange;
    a resilient snap ring disposed on said seat, said snap ring including a tubular ring body having a leading end and a trailing end and a notch at said trailing end;
    a raised grounding lug extending from said seat of said connector body, said lug extending through said notch of said snap ring;
    a locking tang on said ring body of said snap ring, said locking tang including a leading end cantilevered from said ring body and a free trailing end bent outward of said ring body;
    a tensioning tang bent outwards of said ring body at said trailing end of said ring body, said tensioning tang on an opposing side of said ring body from said raised grounding lug of said connector body; and
    a cable attachment arrangement for securing said electrical cable in said trailing bore of said connector body.

2. The electrical connector of claim 1 wherein said cable attachment arrangement for securing said electrical cable in said trailing bore of said connector body includes
    a threaded bore in said connector body, said threaded bore axially aligned substantially perpendicular to the axis of said trailing bore; and
    a threaded fastener in said threaded bore.

3. The electrical connector of claim 2 wherein said cable attachment arrangement for securing said electrical cable in said trailing bore of said connector body includes
    a boss extending from said connector body; and
    said boss includes an outer threaded bore, said outer threaded bore coaxial with said threaded bore of said connector body.

4. The electrical connector of claim 1 wherein said connector body includes
    an outer surface and a trailing flange; and
    a plurality of longitudinal ribs along said outer surface of said connector body, said ribs extending between said main flange and said trailing flange.

5. The electrical connector of claim 1 wherein
    said leading bore and said trailing bore are coaxial; and
    said trailing bore includes a larger diameter than said leading bore.

6. The electrical connector of claim 5 including a peripheral lip within said bore of said connector body at the juncture of said trailing bore and said leading bore.

7. The electrical connector of claim 1 wherein said snap ring includes a plurality of said locking tangs.

8. The electrical connector of claim 1 wherein said free trailing end of said locking tang includes a V-shaped notch therein.

9. The electrical connector of claim 1 wherein said ring body includes a U-shaped slot surrounding said locking tang; and
    said U-shaped slot and said locking tang are between said leading end and trailing end of said ring body.

10. The electrical connector of claim 1 including a guard tang on said ring body of said snap ring, said guard tang enabling said raised grounding lug of said connector body to clear the wall of a junction box as the electrical connector is pressed within said knockout aperture.

11. The electrical connector of claim 1 wherein said snap ring includes a plurality of said locking tangs; and each locking tang in said pair of locking tangs is 180° apart from one another on said ring body.

12. The electrical connector of claim 1 wherein
    said connector body is formed in one-piece; and
    said connector body is electrically conductive.

13. The electrical connector of claim 1 wherein said seat is a cylindrical seat.

14. The electrical connector of claim 1 wherein
    said one-piece electrically conductive tubular connector body is constructed of metal; and said metal for forming said one-piece connector body is a die-cast metal alloy.

15. The electrical connector of claim 14 wherein said metal for forming said one-piece connector body is a zinc alloy.

16. The electrical connector of claim 1 wherein said snap ring is constructed of spring steel.

17. The electrical connector of claim 1 wherein said snap ring is a split snap ring having two ends including a tongue at one end and a groove at a second end;
   said snap ring is constructed of 1050 spring steel; and
   said snap ring includes a thickness of 0.015 to 0.030 inch.

18. The electrical connector of claim 1 wherein said cable attachment arrangement for securing said electrical cable in said trailing bore of said connector body includes
   a wall surrounding said trailing bore of said connector body, said wall of said connector body including an opening therein;
   a cable retainer secured in said trailing bore of said connector body, said cable retainer including a tubular body having a leading end and a trailing end;
   said cable retainer including a wall engagement tang extending from said tubular body of said cable retainer and directed toward said trailing end of said cable retainer; and
   said wall engagement tang extending through said opening in said wall of said connector body.

19. The electrical connector of claim 18 wherein
   said tubular cable retainer is a split ring including a cable retaining tang extending inwardly from said tubular body and directed toward said leading end;
   said cable retaining tang enabling snap in engagement of an electrical cable in said trailing end of said connector body.

* * * * *